United States Patent [19]

McGinniss

[11] 3,925,181

[45] Dec. 9, 1975

[54] CATHODIC ELECTROCOATING PROCESS

[75] Inventor: Vincent D. McGinniss, Valley City, Ohio

[73] Assignee: SCM Corporation, New York, N.Y.

[22] Filed: Oct. 31, 1974

[21] Appl. No.: 519,409

[52] U.S. Cl. .............................................. 204/181
[51] Int. Cl.² ....................................... C25D 13/10
[58] Field of Search ................................. 204/181

[56] References Cited
UNITED STATES PATENTS

| | | | |
|---|---|---|---|
| 3,268,433 | 8/1966 | Abere | 204/181 |
| 3,428,589 | 2/1969 | Coats | 204/181 |
| 3,450,655 | 6/1969 | Spiller | 204/181 |

*Primary Examiner*—Howard S. Williams
*Attorney, Agent, or Firm*—Thomas M. Schmitz; Jerry K. Mueller, Jr.

[57] ABSTRACT

A heat-curable electrocoating composition containing a polymer having pendant amine groups and a bis-maleimide cross-linking agent can be electrodeposited onto a cathode substrate disposed within an aqueous electrocoating bath. The amine groups of the polymer are protonated to render the polymer water-dispersible prior to electrodeposition. Upon electrodeposition, the amine groups become de-protonated and cross-link with the bis-maleimide upon heating to form a fully cured electrodeposited coating on the cathode substrate.

2 Claims, No Drawings

CATHODIC ELECTROCOATING PROCESS

BACKGROUND OF THE INVENTION

This invention relates to electrodeposition of water-dispersed, heat-curable polymers onto a cathode substrate and more particularly to cross-linking said electrodeposited polymers with a heat-reactive bis-maleimide.

Several processes for electrodeposition of heat-curable electrocoating polymers onto a cathode substrate disposed in an aqueous electrocoating bath have been suggested. For example, U.S. Pat. No. 3,617,458 discloses an electrocoating epoxy polymer having pendant amine groups which are neutralized with an inorganic acid to render the polymer water soluble. The epoxy polymer also contains pendant carboxyl groups which cross-link with the epoxide (oxirane) groups of an epoxy resin upon heating to form a cured coating on the cathode substrate. Others have similarly suggested solubilizing through amine groups.

It now has been found that a bis-maleimide cross-linking agent cures a coating which has been electrodeposited onto a cathode substrate. Additionally, the electrocoating polymer contains pendant primary or secondary amine groups which are used for rendering the polymer both water soluble and for cross-linking with the bis-maleimides.

SUMMARY OF THE INVENTION

The instant improved electrocoating composition for electrodeposition onto a cathode substrate disposed within an aqueous electrocoating bath wherein the composition contains a polymer having pendant amine groups and a cross-linking agent in an aqueous dispersion, said polymer being cross-linkable upon subsequent heating of the electrocoated cathode substrate, comprises: a polymer having at least about 5% pendant primary or secondary amine groups, said amine groups being protonated with acid to render said polymer water dispersible in said bath, said amine groups adapted to become de-protonated upon electrodeposition of said polymer on said cathode substrate; and at least about 5% bis-maleimide cross-linking agent by weight of said polymer, said bis-maleimide for cross-linking said polymer by addition polymerization with said de-protonated pendant primary or secondary amine groups upon heating to form a heat-cured electrodeposited coating.

The instant improved process for electrodeposition of a heat-curable electrocoating composition containing a polymer having pendant amine groups and a cross-linking agent in an aqueous dispersion onto a cathode substrate disposed within an aqueous electrocoating bath, said polymer being cross-linkable upon subsequent heating of said electrocoated cathode substrate, comprises:
  a. providing said electrocoating composition containing
    i. a polymer having at least about 5% pendant primary or secondary amine groups, said amine groups being protonated with acid to render said polymer water dispersible in said bath and
    ii. at least about 5% bis-maleimide cross-linking agent by weight of said polymer;
  b. applying an electromotive potential through said bath to electrodeposit said polymer and said cross-linking agent onto said cathode substrate, said pendant amine groups of said polymer becoming de-protonated thereby; and
  c. heating said electrocoated cathode substrate, said bis-maleimide cross-linking said polymer by addition polymerization with said de-protonated pendant amine groups to form a heat-cured electrodeposited coating.

DETAILED DESCRIPTION OF THE INVENTION

The reaction mechanism by which cross-linking of the polymer through the bis-meleimide occurs is an addition polymerization reaction known as the Michael-type addition reaction, as more particularly described in "Organic Reactions," Vol. 10 (pages 179–555), John Wiley and Sons (1959), which is incorporated expressly herein by reference. The Michael-type addition reacts a primary or secondary amine group with alpha-,beta-ethylenically unsaturated carbon-carbon or carbonyl groups in order to achieve linking of the amine group and the carbon-carbon or carbonyl groups. The alpha-,beta-ethylenic unsaturation of the bis-maleimides is used in the instant invention.

The electrocoating composition generally is a polymer or resin selected according to final desired use from a wide variety of known polymers in the electrocoating art.

The polymers contain pendant primary and/or secondary amine groups. By protonating such amine groups, the polymer can be water dispersed. Electrodeposition of the polymer de-protonates the amine groups for cross-linking with the bis-maleimide cross-linking agent in a Michael-type addition reaction. Amine groups can be attached to the polymer by reacting free carboxyl groups on a polymer (polyester, acrylic, urethane, etc.) containing available carboxyl groups which can be reacted with alkyleneimine or substituted alkyleneimine, as proposed in U.S. Pat. No. 3,679,564 and U.S. Pat. No. 3,617,458, and incorporated herein by reference. Similarly, amine groups can be introduced into the polymer by reacting pendant carboxylic acid groups on a polymer with ethylene imine or derivatives of ethylene imine. Difunctional amines also can be reacted with reactive pendant carboxyl groups on the polymer.

Blocked amines also can be attached to the polymer and subsequently transformed into primary amine groups by an appropriate reaction which will be outlined in detail later herein. Such blocked amine groups can be attached to epoxy resins or acrylic resins having pendant oxirane groups by reacting a ketimine blocked diethylene triamine, formed from reacting diethylene triamine with an excess of methyl ethyl ketone, with the polymer. Such a reaction can be illustrated as follows:

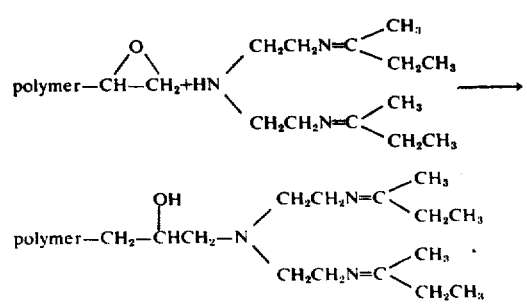

Similar blocked dialkyltriamines also can be employed to attach the blocked amine groups as above set forth.

The primary and/or secondary amine groups are pendantly attached to the polymer. For purposes of this application, pendant amine groups include terminal amine groups. By pendantly attached is meant that such amine groups are attached to the polymer chain or to a pendant side chain of the polymer.

The polymer containing pendant amine groups should contain at least about 5% by weight of such pendant amine groups, and up to about 50% if desired.

Representative polymers containing pendant amine groups can be derived from epoxy and epoxy-modified diglycidyl ethers of bis-phenol A structures, various aliphatic polyethylene or polypropylene glycol (diglycidal ether) adducts, and glycidyl ethers of phenolic resins, such epoxy resins being commercially available and commonly used in the electrocoating field.

Other useful polymers containing pendant amine groups include polyamide resins, for example, condensation products of dimerized fatty acids coreacted with difunctional amine, such as ethylene diamine. Polyamide resins generally are between about 500 and about 5,000 molecular weight. Further useful electrocoating polymers containing pendant amine groups include acrylic resins having molecular weight of about 1,000 to about 100,000, polyester resins and polyurethane resins both having a molecular weight range of about 500 to about 5,000, vinyl resins, and amine resins.

Various other useful electrocoating polymers containing pendant amine groups can be advantageously employed in the electrocoating composition of this application as will become more apparent in the examples.

The cross-linking agent is a bis-maleimide having alpha-,beta-ethylenic unsaturation capable of being heat reactive to cross-link the amine groups on the polymer.

Bis-maleimides are represented by the following general structure:

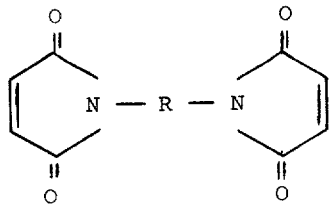

where R is alkyl, aryl, alkyl-aryl, or polymers having a molecular weight up to about 3,000.

Alkylene-, aryl-bis-maleimides and combinations thereof are particularly useful as the cross-linking agent of this invention. Specific bis-maleimides which are particularly suited to the precepts of this invention can be selected from the group consisting of dimethylenedimaleimide, trimethylenedimaleimide, tetramethylenedimaleimide, tetramethylenedimaleimide, pentamethylenedimaleimide, hexamethylenedimaleimide, heptamethylenedimaleimide, decamethylenedimaleimide, 4,4'-methylene-bis (ortho-chloroaniline), 4,4'-methylene-dianiline, 4,4'-methylenebis (3-nitroaniline), 4-aminophenylether, N,N'-ortho-phenylenedimaleimide, N,N'-para-phenylenedimaleimide, and N,N'-meta-phenylenedimaleimide.

Bis-maleimides can be synthesized by various methods such as are disclosed in U.S. Pat. Nos. 2,444,536 and 3,622,321, and the same are incorporated expressly herein by reference. Generally, a diluted ether solution of diamine is added to a similar diluted ether solution of maleic anhydride which results in a maleamic acid. The maleamic acid can be disposed in acetic anhydride and converted into the corresponding bis-maleimide in the presence of potassium acetate.

In practicing this invention, the polymer is rendered water soluble by adding sufficient acid to the polymer to completely neutralize the polymer. Appropriate acids are, for example, proton-donating acids such as phosphoric, sulfuric, hydrochloric, acetic, formic, lactic, and other proton-donating organic and inorganic acids. Water solubility is achieved by the protonating of all (primary, secondary and tertiary if there be any) amine groups of the polymer by the acid. The protonating of the amine groups of the polymer also renders the polymer positively-charged so that during electrodepostion the polymer can migrate to the cathode substrate and be deposited thereon. Also, while the pendant primary and/or secondary groups of the polymer are protonated, such amine groups will not react with bis-maleimide as the polymer is stable in water. A polymer having blocked amine groups is treated with a proton-donating acid in water in order to protonate all amine groups for water solubility of the polymer and to remove the blocking group from the pendant amine groups in order to convert such tertiary amine groups into protonated primary amine groups.

The neutralized polymer is blended with at least about 5% bis-maleimide cross-linking agent by weight of the polymer and up to about 25% if desired. The blend is then dispersed in water to form the electrocoating bath of from about 5 to about 20% non-volatile dispersion. The bath is generally at about 60 to about 125°F, with about 70 to about 95°F being preferred.

The neutralized (protonated) polymer and bis-maleimide are both stable in the bath and no interraction there occurs. The cathode substrate to be electrocoated is then immersed in the electrocoating bath while an electric potential is maintained therethrough as disclosed in U.S. Pat. No. 3,619,398, the same being incorporated herein by reference. During electrodeposition the positively charged polymer along with the bis-maleimide migrate to the cathode substrate. The protonated amine groups of the polymer become deprotonated (lose protons) due to the electric potential applied. The polymer and bis-maleimide are codeposited on the cathode substrate. The electric potential applied to the bath is generally between about 20 and about 500 volts, with about 50 to about 300 volts being preferred.

The coated substrate is removed from the bath, washed with water to remove excess coating, and then conventionally heat-cured at a temperature of at least about 100° and preferably between about 200° and 400°F for about 5 to about 40 minutes.

The polymer cross-links through the de-protonated pendant primary and/or secondary amine groups attached to the electrocoated polymer. Water solubility and cross-linking of the polymer both occur through the same pendant amine groups of the polymer.

The alpha-,beta-ethylenic unsaturation of the bis-maleimide is heat-reactive under the conditions of curing and readily reacts with the pendant amine groups of the polymer in Michael-type addition reaction or addition polymerization. Upon such heating a fully cured electrodeposited coating coats the cathode substrate.

The cathode substrate is an electrically conductive metal such as iron, steel, aluminum, copper, galvanized steel, zinc, and the like. The cathode substrate can be in the shape of bars, sheets, irregularly shaped forms with rounded or sharp edges, and like shapes.

The electrocoating composition can obtain opacifying pigments and inert extenders such as, for example, titanium dioxide, zinc oxide, clays such as kaolinite clays, silica, talc, and the like.

The following examples show how the instant invention can be practiced, but should not be construed as limiting the invention. In the specification all parts are parts by weight, all percentages are weight percentages, and all temperatures are in degrees Fahrenheit, unless otherwise expressly indicated.

EXAMPLE 1

One mole of DER 332 epoxy resin (Dow Epoxy Resin, epoxide equivalent weight 172–196, Dow Chemical Company) was reacted with 2 moles of cyclohexyl amine in butyl cellosolve in order to attach pendant amine groups to the epoxy resin. The resin was completely neutralized with 2 moles of acetic acid. The bis-maleimide was 1,6 hexamethylene-bis-maleimide which was synthesized by reacting 1 mole of 1,6 hexamethylenediamine with 2 moles of maleic anhydride. The resin was blended with 100 grams of the bis-maleimide and added to water to form a 7% non-volatile dispersion.

A steel panel was immersed in the bath as the cathode and the electrocoating composition was electrodeposited therein at 50 volts for 2 minutes. The coated panel was removed from the bath, washed with water, and baked at 360°F for 15 minutes. A solvent-resistant coating covered the panel indicating that curing had taken place.

EXAMPLE 2

A polyester resin was prepared by reacting 1 mole of phthalic anhydride, 1 mole of succinic anhydride, and 1 mole of propylene glycol. Such reaction was carried out in toluene with azeotropic distillation of water. This reaction product, an acid-terminated polyester, then was reacted with 2 moles of hexamethylene diamine and the water removed to form a diamine-terminated polyester resin.

The amine resin next was completely neutralized with 6 moles of acetic acid and blended with 20% by weight of metaphenylene-bis-maleimide. The blend was added to demineralized water to form a 10% non-volatile dispersion. A steel panel then was cathodically electrocoated in the electrocoating bath, washed with water, and baked at 250° for 40 minutes. Again, a fully cured electrodeposited coating covered the panel.

EXAMPLE 3

A polyamide resin was formulated by reacting 1 mole of succinic anhydride with 2 moles of hexamethylene diamine in toluene with removal of water by azeotropic distillation.

The diamine resin then was completely neutralized with 2.5 moles of acetic acid. The neutralized polymer is blended with 20% by weight tetramethylene-bis-maleimide and this blend added to water to form a 10% non-volatile dispersion. A steel panel was cathodically electrocoated, washed with water and baked at 360° for 30 minutes. A fully cured electrodeposited coating covered the panel upon such baking.

EXAMPLE 4

One mole of an epoxy resin (DER 664, epoxy equivalent weight of 900, Dow Epoxy Resin, Dow Chemical Company) was reacted at 60°C with 2 moles of the ketimine blocked diethylene triamine of the specification,

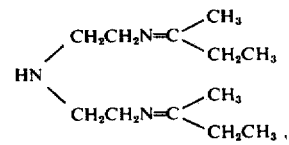

completely neutralized with 4 moles lactic acid, and blended with 20% N,N'-para-phenylenedimaleimide. The blend was then added to deionized water to form a 7% non-volatile (solids) dispersion.

This electrocoating composition was cathodically electrodeposited at 100 volts for 1 minute onto steel panels. The panels then were removed from the bath, washed with water, and baked at 300° for 30 minutes. A hard, flexible, solvent-resistant coating covered the steel panel.

EXAMPLE 5

The procedure of Example 4 was followed except that the N,N'-para-phenylenedimaleimide was omitted from the blend. The electrocoated steel panels upon baking did not have a solvent-resistant coating thereon, indicating that the electrocoating had not cured.

EXAMPLE 6

An acrylic resin was synthesized by the solution polymerization of 30% ethylacrylate, 20% styrene, 30% butyl acrylate, and 20% glycidyl methacrylate. This reaction was run under standard solution acrylic polymerization conditions using butyl cellosolve as the solvent and azobisisobutyl nitrile as the initiator.

The solution acrylic polymer contained pendant oxirane groups. The solution acrylic polymer was reacted with 15% of the ketimine blocked diethylene triamine of Example 4 to form an acrylic resin with pendant amine groups.

The amine-acrylic resin then was completely neutralized with 4 moles of lactic acid, blended with 20% N,N'-ortho-phenylenedimaleimide, and added to water to form an 8% non-volatile dispersion.

This electrocoating composition was cathodically electrodeposited onto steel panels in a manner similar to Example 4, washed with water, and baked at 400° for 25 minutes. A hard, flexible, fully cured, solvent-resistant coating covered the panels.

EXAMPLE 7

A methane resin was synthesized from the reaction of 1 mole of toluenediisocyanate and 1 mole of ethylene glycol. The diisocyanate-terminated resin was then reacted with 2 moles of the ketimine blocked diethylene triamine of Example 4. The amine resin was completely neutralized with 4 moles lactic acid and blended with 15% of hexamethylene-bis-maleimide. The electrocoating bath was formed by adding the resin and bis-maleimide to water to form an 8% non-volatile dispersion.

The blend was cathodically electrodeposited onto a steel panel at 100 volts for 2 minutes. The steel panel was then removed from the bath, washed with water, and baked at 400° for 10 minutes. A fully cured electrodeposited coating covered the panel.

EXAMPLE 8

A polymer-bis-maleimide was prepared by reacting 2 moles of succinic anhydride with 1 mole of polyoxyethylene glycol (molecular weight of 1540), which reaction product was further reacted with 2 moles of hexamethylene diamine. This polymer-diamine was dissolved in tetrahydrofuran (10% solution by weight) and then added to a solution of 2 moles of maleic anhydride (10% solution by weight in tetrahydrofuran) to form a polyether-bis-maleimide compound in the presence of acetic anhydride and of potassium acetate.

One mole of the epoxy resin of Example 4 (DER 664) was reacted at 60°C with 2 moles of the ketimine blocked diethylene triamine of Example 4 followed by further reaction with 1 mole of linseed oil fatty acid. This resin was completely neutralized with 4 moles of acetic acid and blended with 50% polyether-bis-maleimide by weight of the resin. The blend was added to deionized water to form an 8% non-volatile dispersion.

This electrocoating composition was cathodically electrodeposited at 100 volts for 1 minute onto a steel panel. The panel was removed from the bath, washed with water, and baked at 400° for 35 minutes. A hard, flexible, solvent resistant coating covered the panel.

EXAMPLE 9

The neutralized resin of Example 8 (unsaturated oil-modified epoxy resin neutralized with acetic acid) was blended with 20% by weight 4,4'-methylene-bis-(ortho-chloroaniline). The blend was added to deionized water to form an 8% non-volatile dispersion.

This electrocoating composition was cathodically electrocoated and baked in a manner similar to Example 8. A hard, flexible, solvent resistant coating covered the panel.

I claim:

1. In a process for electrodeposition of a heat-curable electrocoating composition containing a polymer having pendant amine groups and a cross-linking agent in an aqueous dispersion onto a cathode substrate disposed within an aqueous electrocoating bath, said polymer being cross-linkable upon subsequent heating of said electrocoated cathode substrate, the improvement comprising:
   a. providing said electrocoating composition containing
      i. a polymer having at least about 5% pendant primary or secondary amine groups, said amine groups being protonated with acid to render said polymer water dispersible in said bath and
      ii. at least about 5% bis-maleimide cross-linking agent by weight of said polymer;
   b. applying an electromotive potential through said bath to electrodeposit said polymer and said cross-linking agent onto said cathode substrate, said pendant amine groups of said polymer becoming de-protonated thereby; and
   c. heating said electrocoated cathode substrate, said bis-maleimide cross-linking said polymer by addition polymerization with said de-protonated pendant amine groups to form a heat-cured electrodeposited coating.

2. The electrodeposition process of claim 1 wherein said heating said electrocoated cathode substrate is at a temperature of at least about 100°F.

* * * * *